United States Patent
Na et al.

(10) Patent No.: US 8,965,215 B2
(45) Date of Patent: Feb. 24, 2015

(54) DISPLAY APPARATUS AND CONTROL METHOD THEREOF

(75) Inventors: Moon-sung Na, Yongin-si (KR); Sun-ho Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 12/477,171

(22) Filed: Jun. 3, 2009

(65) Prior Publication Data

US 2010/0104292 A1    Apr. 29, 2010

(30) Foreign Application Priority Data

Oct. 24, 2008    (KR) .................. 10-2008-0104821

(51) Int. Cl.
| | |
|---|---|
| H04B 10/00 | (2013.01) |
| H04N 5/44 | (2011.01) |
| H04N 21/41 | (2011.01) |
| H04N 21/4363 | (2011.01) |

(52) U.S. Cl.
CPC ......... H04N 5/4403 (2013.01); H04N 21/4122 (2013.01); H04N 21/43637 (2013.01); G09G 2330/021 (2013.01)
USPC ............................ 398/130; 398/118; 398/128

(58) Field of Classification Search
None
See application file for complete search history.

(56) References Cited

U.S. PATENT DOCUMENTS

| | | | |
|---|---|---|---|
| 6,255,944 B1 * | 7/2001 | Addy | .......................... 340/539.3 |
| 6,930,661 B2 | 8/2005 | Uchida et al. | |
| 7,038,663 B2 | 5/2006 | Uchida et al. | |
| 7,071,896 B2 | 7/2006 | Uchida et al. | |
| 7,227,512 B2 | 6/2007 | Uchida et al. | |
| 7,733,295 B2 | 6/2010 | Uchida et al. | |
| 8,031,056 B2 | 10/2011 | Arai | |
| 2002/0054028 A1 | 5/2002 | Uchida et al. | |
| 2004/0041903 A1 | 3/2004 | Drexler et al. | |
| 2005/0183135 A1 | 8/2005 | Uchida et al. | |
| 2005/0188401 A1 | 8/2005 | Uchida et al. | |
| 2005/0188417 A1 | 8/2005 | Uchida et al. | |
| 2005/0188418 A1 | 8/2005 | Uchida et al. | |
| 2006/0279430 A1 | 12/2006 | Arai | |
| 2007/0008302 A1 * | 1/2007 | Uchida et al. | .................. 345/173 |
| 2007/0124778 A1 | 5/2007 | Bennett | |
| 2007/0197186 A1 * | 8/2007 | Muqattash et al. | ........ 455/343.1 |

FOREIGN PATENT DOCUMENTS

| | | |
|---|---|---|
| CN | 1336768 A | 2/2002 |
| CN | 1475074 A | 2/2004 |

(Continued)

OTHER PUBLICATIONS

European Search Report for EP 09 16 7388, dated Jan. 8, 2010 (6 pages as submitted by Applicant).*
US 7,116,285, 10/2006, Uchida et al. (withdrawn).
Communication dated May 10, 2013 issued by the State Intellectual Property Office of P.R. China in counterpart Chinese Patent Application No. 200910159731.X.

(Continued)

*Primary Examiner* — Darren E Wolf
(74) *Attorney, Agent, or Firm* — Sughrue Mion, PLLC (57) ABSTRACT

A display apparatus which supports wireless/optical communication is provided. The display apparatus includes a wireless/optical interface which performs wireless/optical communication with at least one first external apparatus, a power supply unit which supplies power to the wireless/optical interface, a user interface through which a device is selected, and a controller which controls power supply from the power supply unit to the wireless/optical interface according to user selection on the user interface.

11 Claims, 9 Drawing Sheets

(56) References Cited

FOREIGN PATENT DOCUMENTS

| | | |
|---|---|---|
| CN | 2754294 Y | 1/2006 |
| CN | 1874435 A | 12/2006 |
| CN | 1925584 A | 3/2007 |
| EP | 1 175 087 A2 | 1/2002 |
| EP | 1 211 895 A1 | 6/2002 |
| EP | 1 505 771 A1 | 2/2005 |
| EP | 1 340 371 B1 | 3/2012 |
| KR | 20-0156375 Y1 | 9/1999 |
| KR | 10-2006-0110682 A | 10/2006 |
| WO | 02/45417 A1 | 6/2002 |

OTHER PUBLICATIONS

Communication dated Dec. 13, 2013 issued by the State Intellectual Property of P.R. China in counterpart Chinese Application No. 200910159731.X.

Communication, dated Jun. 13, 2014, issued by the State Intellectual Property Office of P.R. China in counterpart Patent Application No. 200910159731.X.

Communication, Issued by the Korean Intellectual Property Office, Dated Sep. 11, 2014, in counterpart Korean Application No. 10-2008-0104821.

* cited by examiner

DISPLAY APPARATUS AND CONTROL METHOD THEREOF

CROSS-REFERENCE TO RELATED APPLICATIONS

This application claims priority from Korean Patent Application No. 10-2008-0104821, filed on Oct. 24, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a display apparatus and controlling the display apparatus, and more particularly, to providing a display apparatus which performs wireless/optical communication with an external apparatus, and controlling the display apparatus.

2. Description of the Related Art

Recently, various types of products applying wireless/optical modules as high quality video/audio interfaces have appeared. However, most of these products are either incapable of controlling power of wireless/optical modules or need switches, which results in a great deal of power consumption and causes inconvenience to users.

For example, a conventional wireless/optical system is configured by connecting only a single wireless display apparatus to a wireless set-top box (STB). Accordingly, when a user turns on the wireless display apparatus using a remote controller, power is supplied to an image processor and display unit of the wireless display apparatus, and power-on data is transmitted to the wireless STB. In response to the power-on data, the wireless STB supplies operating power to a tuner, and the tuner then tunes to a radio frequency (RF) signal to obtain a digital video signal. The digital video signal is transmitted to the wireless display apparatus. Additionally, when the user turns off the wireless display apparatus using the remote controller, the power supplied to the image processor and display unit of the wireless display apparatus is cut off, and power-off data is transmitted to the wireless STB. In response to the power-off data, the wireless STB stops supplying power to the tuner.

Accordingly, when a user points the remote controller toward the wireless display apparatus in order to turn on or off the wireless display apparatus in a conventional wireless/optical system, the wireless STB may also be turned on or off, thus increasing power consumption.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus which enables a user to control whether or not to supply power to a wireless/optical module which supports wireless/optical communication through a user menu, and a method for controlling the display apparatus.

According to an aspect of the present invention, there is provided a display apparatus comprising a wireless/optical interface which performs wireless/optical communication with at least one first external apparatus; a power supply unit which supplies power to the wireless/optical interface; a user interface through which a device is selected; and a controller which controls power supply from the power supply unit to the wireless/optical interface according to user selection on the user interface.

The at least one first external apparatus may be a source device which provides an input source, or a relay device which receives an external input source and provides the received source.

The controller may control the user interface to display a device list of one or more devices connected to the relay device, if the at least one first external apparatus is the relay device.

The display apparatus may further comprise a wired interface through which the display apparatus performs wired communication with at least one second external apparatus.

The user interface may display a list containing at least one of the following: the at least one second external apparatus which performs wired communication via the wired interface; one or more devices connected to the first external apparatus which performs wireless/optical communication via the wireless/optical interface; and the first external apparatus.

The controller may control the power supply unit to cut off power to the wireless/optical interface, if the at least one second external apparatus is selected using the user interface.

The controller may control the power supply unit to supply power to the wireless/optical interface, if the at least one first external apparatus is selected using the user interface.

The controller may control the user interface to display a confirmation window, if there is a change in whether or not the power supply unit supplies power to the wireless/optical interface.

The controller may transmit a control signal to the at least one first external apparatus in order to control power of the at least one first external apparatus.

According to another aspect of the present invention, there is provided a wireless/optical system comprising a display apparatus which performs wireless or optical communication with at least one first external apparatus; and the at least one first external apparatus which performs wireless or optical communication with the display apparatus, and sends an external input signal to the display apparatus. Whether or not power is supplied to a wireless/optical module, which supports communication between the display apparatus and at least one first external apparatus, may be determined according to whether or not the at least one first external apparatus is selected.

The at least one first external apparatus may be a source device which provides an input source, or a relay device which receives an external input source and provides the received source.

According to another aspect of the present invention, there is provided a method for controlling a display apparatus, which performs wireless/optical communication with at least one first external apparatus, the method comprising providing a user interface through which a device is selected; and controlling power supply to the wireless/optical module, through which the display apparatus performs wireless/optical communication with the at least one first external apparatus, if the at least one first external apparatus is selected using the user interface.

The at least one first external apparatus may be a source device which provides an input source, or a relay device which receives an external input source and provides the received source.

The method may further comprise displaying a device list of one or more devices connected to the relay device, if the at least one first external apparatus is the relay device.

The display apparatus may perform wired communication with at least one second external apparatus.

The method may further comprise displaying a list containing at least one of the following: the at least one second external apparatus which performs wired communication; one or more devices connected to the first external apparatus which performs wireless/optical communication; and the first external apparatus.

The power may be cut off to the wireless/optical module, if the at least one second external apparatus is selected.

The power may be supplied to the wireless/optical module, if the at least one first external apparatus is selected.

The method may further comprise displaying a confirmation window, if there is a change in whether the power is supplied to the wireless/optical module.

The method may further comprise transmitting a control signal to the at least one first external apparatus in order to control power of the at least one first external apparatus.

Therefore, it is possible for a user to control whether or not to supply power to a wireless/optical module through a user menu, so it is also possible to prevent power consumption.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
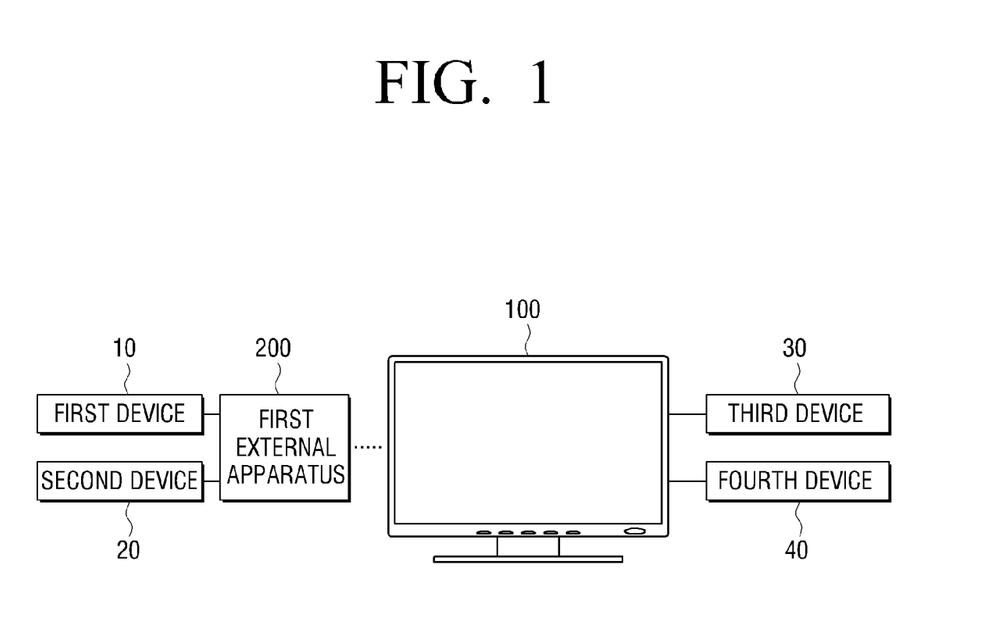
FIG. 1 illustrates a display system according to an exemplary embodiment of the present invention.

FIG. 1 illustrates a display system according to an exemplary embodiment of the present invention. The display system of FIG. 1 comprises a display apparatus 100, a first external apparatus 200, and first to fourth devices 10, 20, 30 and 40.

The display apparatus 100 receives video and audio signals from the first to fourth devices 10, 20, 30 and 40, and displays video and audio corresponding to the video and audio signals. The first to fourth devices 10, 20, 30 and 40 may function as input sources, and may be a personal computer (PC), a digital versatile disc (DVD) player, a video cassette recorder (VCR) player, or a Blu-ray player.

The first external apparatus 200 receives a video signal from the first and second devices 10 and 20, which are connected via a wired connection to the first external apparatus 200, and provides the display apparatus 100 with the received video signal while performing wireless/optical communication with the display apparatus 100. The first external apparatus 200 may be a set-top box (STB), which receives a video signal from a video source.

The display apparatus 100 is connected to the first external apparatus 200 wirelessly or via an optical cable, to perform wireless/optical communication. The first external apparatus 200 is connected via a wired connection to the first and second devices 10 and 20 to perform wired communication. The display apparatus 100 performs wired communication with the third and fourth devices 30 and 40.

In the exemplary embodiment of the present invention, 'wireless/optical communication' refers to a wireless communication technology or an optical communication technology using an optical cable. A wireless communication technology may be performed by a wireless local area network (WLAN) or other wireless communication standards or protocols. IEEE 802.11, namely the international standard for the WLAN, provides detailed specifications for medium access control (MAC) and physical layer (PHY), and is classified into 801.11, 802.11a, 802.11b and 802.11g, each of which is different in terms of frequency band, transmission rate and modulation mode.

An optical communication technology refers to a communication mode to convert electric signals corresponding to video, audio or data, into laser beams and to transmit laser beams via an optical cable comprising thin glass fibers. Such an optical cable efficiently transmits a large amount of information and has improved protection against errors due to magnetism and electricity, as compared to a coaxial cable, and accordingly the optical cable is generally used in wired communication networks. A conventional wired communication technology requires a coaxial cable, but the transmission capacity of the coaxial cable is lower than that of an optical cable, so the coaxial cable is apt to be affected by magnetism or electricity. However, using an optical cable instead of the coaxial cable may solve such problems.

Figure 2:
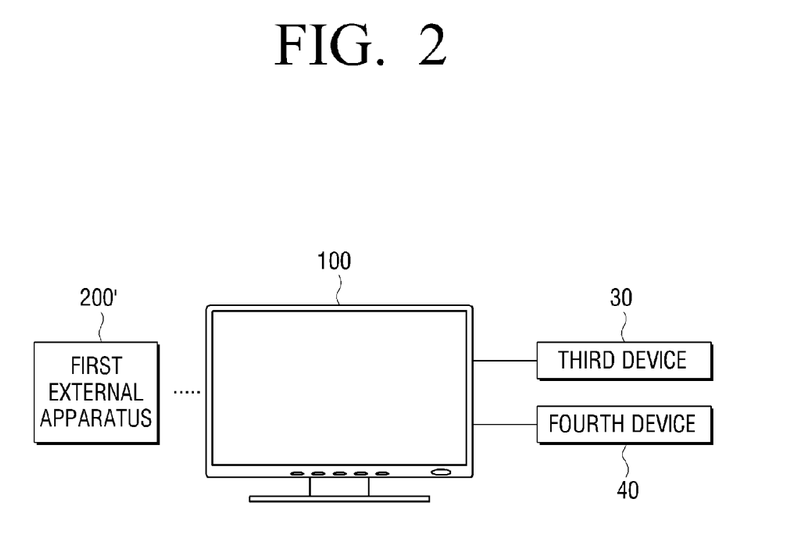
FIG. 2 illustrates a display system according to another exemplary embodiment of the present invention.

FIG. 2 illustrates a display system according to another exemplary embodiment of the present invention. The display system of FIG. 2 comprises a display apparatus 100, a first external apparatus 200', a third device 30 and a fourth device 40.

The first external apparatus 200' directly transmits an input signal to the display apparatus 100, unlike the first external apparatus 200 of FIG. 1. In other words, the first external apparatus 200' may be implemented as a DVD player, a VCR player or a blue ray player capable of providing video sources.

Additionally, the first external apparatus 200' comprises a wireless/optical module, which is capable of performing direct wireless/optical communication with the display apparatus 100.

The display apparatus 100, third device 30 and fourth device 40 are the same as those shown in FIG. 1, so no further description is given.

The display system of FIG. 2 comprises only a single first external apparatus 200' which performs wireless/optical communication with the display apparatus 100, but may comprise a plurality of first external apparatuses under different circumstances.

Figure 3:
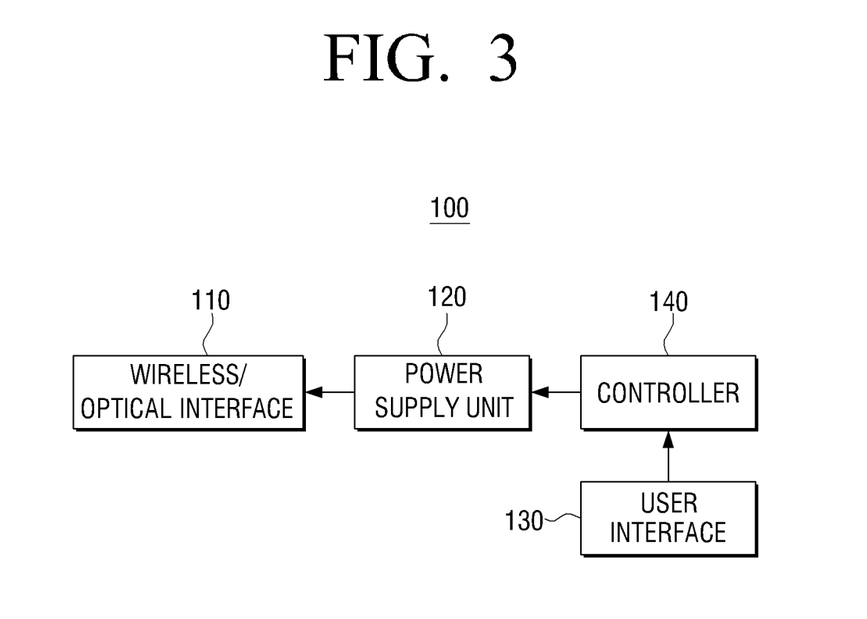
FIG. 3 is a block diagram of a display apparatus according to an exemplary embodiment of the present invention.

FIG. 3 is a schematic block diagram of a display apparatus 100 according to an exemplary embodiment of the present invention. The display apparatus 100 shown in FIG. 3 comprises a wireless/optical interface 110, a power supply unit 120, a user interface 130 and a controller 140.

The wireless/optical interface 110 comprises a wireless/optical module, and may function as a transmitter Tx or a receiver Rx under the control of the controller 140.

In more detail, data required to determine whether the wireless/optical module functions as a transmitter Tx or a receiver Rx is transmitted from the controller 140 to the wireless/optical interface 110 using a serial port such as a universal asynchronous receiver and transmitter (URAT). The wireless/optical module of the wireless/optical interface 110 generally acts as a receiver Rx to receive an input signal from an external input source, but may act as a transmitter Tx in order to transmit the received input signal to an external display apparatus connected to the display apparatus 100 or to a storage medium (not shown). Additionally, if a power supply control signal is received from the controller 140, the wireless/optical module may also function as a transmitter in order to transmit the received power supply control signal to an external apparatus (not shown).

The wireless/optical interface 110 may perform wireless/optical communication with at least one first external apparatus comprising a wireless/optical module. The at least one first external apparatus may be a source device which provides a source input, or a relay device which receives an external source input and provides the received external source input. For example, the source device may be a DVD player, a VCR player or a Blu-ray player, and the relay device may be an STB which receives a signal from a source device, such as a DVD player, a VCR player or a Blu-ray player, and transmits the received signal to the display apparatus 100.

The power supply unit 120 supplies power to the wireless/optical interface 110.

The power supply unit 120 may supply power or cut off power to the wireless/optical interface 110 according to the control of the controller 140, of which detailed description will be given later with reference to FIG. 4.

The user interface 130 provides a device list from which a user can select a device, in order to enable communication between the display apparatus 100 and the user. The user interface 130 may be provided in on-screen-display (OSD) mode, and may display a device list showing all or part of devices connected to the display apparatus 100. In this situation, the user may select one or more devices from the device list using an input unit (not shown), such as a key panel, a remote controller or a voice recognition means.

Additionally, the user interface 130 may display a confirmation window in order to enable a user to confirm a change in whether or not power is supplied to the wireless/optical interface 110.

The controller 140 controls the overall operations of the display apparatus 100.

If a user selects at least one device from the device list displayed on the user interface 130, the controller 140 controls the power supply unit 120 to supply power or cut off power to the wireless/optical interface 110 according to the type of the device selected.

Figure 4:
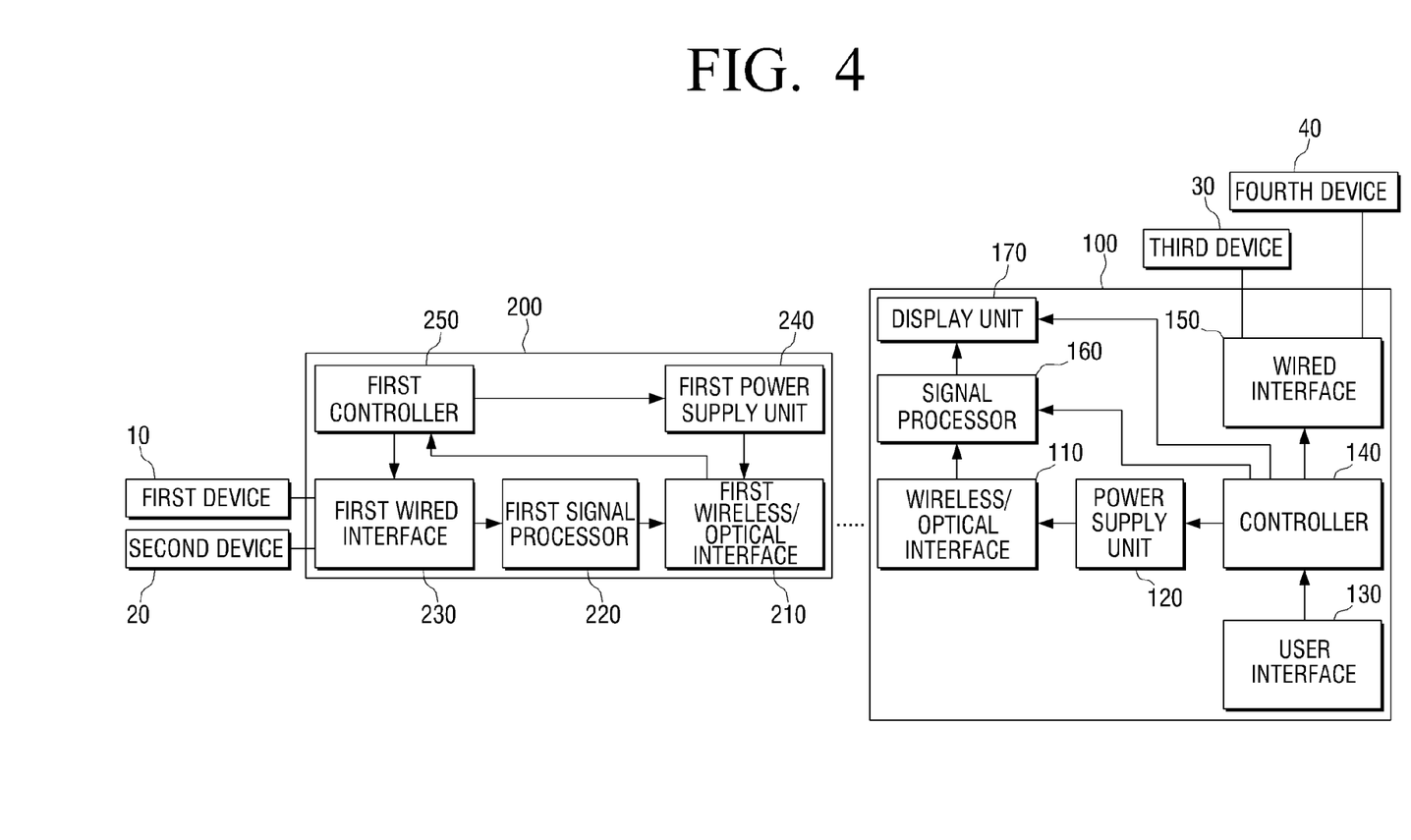
FIG. 4 is a block diagram of a detailed configuration of the display system of FIG. 1.

FIG. 4 is a block diagram of a detailed configuration of the display system of FIG. 1. Those skilled in the art can easily derive a detailed configuration of the display system of FIG. 2 from the display system of FIG. 4, so no further description is given.

Referring to FIG. 4, the display apparatus 100 comprises a wireless/optical interface 110, a power supply unit 120, a user interface 130, a controller 140, a wired interface 150, a signal processor 160 and a display unit 170. The first external apparatus 200 comprises a first wireless/optical interface 210, a first signal processor 220, a first wired interface 230, a first power supply unit 240 and a first controller 250. Since the wireless/optical interface 110, power supply unit 120, user interface 130 and controller 140 have been described above with reference to FIG. 3, detailed description thereof is omitted herein.

The first external apparatus 200 receives input signals from the first device 10 and second device 20 (namely external input sources), and transmits the received input signals to the display apparatus 100. The first external apparatus 200 may be implemented as an STB which receives an input signal and provides the received signal outside.

The two external input sources are connected to the first external apparatus 200 in the exemplary embodiment of the present invention for convenience of description, but there is no limitation to the number of external input sources to which the present invention is applicable.

The first and second devices 10 and 20 are connected to the first external apparatus 200 in a wired manner. The first and second devices 10 and 20 may be implemented as various devices capable of providing external input signals, for example a DVD player, a VCR player or a Blu-ray player.

The first wired interface 230 receives input signals from the first and second devices 10 and 20. The first wired interface 230 may comprise an antenna and a plurality of ports to which a plurality of connection cables for connecting each input source are attached. For example, the plurality of ports may be ports used for a PC analog signal, a PC digital signal, a television (TV), video, S-video, component or digital TV (DTV). Additionally, the antenna receives a satellite digital broadcast signal, a terrestrial digital broadcast signal, or an analog signal, and each of the plurality of ports receives an analog composite video signal, a digital signal or an analog signal.

The first signal processor 220 processes input signals received by the first wired interface 230 to be suitable for wireless/optical communication, and transmits the processed signals to the first wireless/optical interface 210. For example, when the first signal processor 220 comprises an analog-to-digital converter (ADC, not shown) and an encoder (not shown), if an analog signal is received by the first wired interface 230, the first signal processor 220 may convert the received analog signal into a digital signal, and may compress the converted digital signal in a compressed format, such as a moving picture experts group (MPEG). In this situation, if a digital signal is received, the first signal processor 220 may send the received digital signal to the first wireless/optical interface 210 directly without any processing.

The first wireless/optical interface 210 comprises a wireless/optical module, which supports the wireless/optical communication. The first wireless/optical interface 210 enables wireless communication or optical communication between the first external apparatus 200 and the display apparatus 100.

The first power supply unit 240 supplies power to the first wireless/optical interface 210 under the control of the first controller 250. Additionally, the first power supply unit 240 may supply power required to perform the overall operations of the first external apparatus 200 to each unit.

The first controller 250 controls the overall operations of the first external apparatus 200. Specifically, the first controller 250 may control power supply to the first wireless/optical interface 210.

If a control signal to supply power or cut off power to the first wireless/optical interface 210 is received from the display apparatus 100, the first controller 250 may control the first power supply unit 240 to supply power or cut off power according to the control signal.

The display apparatus 100 comprises a wireless/optical interface 110, a power supply unit 120, a user interface 130, a controller 140, a wired interface 150, a signal processor 160 and a display unit 170.

The wireless/optical interface 110 of the display apparatus 100 comprises a wireless/optical module, which is able to function as a transmitter or a receiver.

The wireless/optical interface 110 of the display apparatus 100 performs wireless communication or optical communication with the first wireless/optical interface 210 of the first external apparatus 200, receives input signals from the first and second device 10 and 20 connected to the first external apparatus 200, and transmits the control signal output from the controller 140 to the first external apparatus 200.

Accordingly, the controller 140 may control the first power supply unit 240 to supply power or cut off power to the first wireless/optical interface 210 according to the control signal.

The wired interface 150 receives input signals from the third and fourth devices 30 and 40 which perform wired communication. The wired interface 150 may comprise an antenna and a plurality of ports to which a plurality of connection cables for connecting each input source are attached. For example, the plurality of ports may be ports used for a PC analog signal, a PC digital signal, a TV, video, S-video, a component or a DTV.

The power supply unit 120 supplies power to the wireless/optical interface 110 under the control of the controller 140. Additionally, the power supply unit 120 may supply power required to perform the overall operations of the display apparatus 100 to each unit.

The user interface 130 provides a device list from which a user can select a device, in order to enable communication between the display apparatus 100 and the user. The user interface 130 may be provided in OSD mode, and may display a device list showing devices connected to the display apparatus 100.

For example, if a user selects an external input mode, the user interface 130 may provide a list comprising the first and second devices 10 and 20 which send input signals to the display apparatus 100 through the first external apparatus 200 using wireless/optical communication, and the third and fourth devices 30 and 40 which are connected to the display apparatus 100 in a wired manner to transfer input signals to the display apparatus 100.

In this situation, the user interface 130 may display the list by distinguishing the first and second devices 10 and 20 for performing wireless/optical communication from the third and fourth devices 30 and 40 for performing wired communication. For example, the first to fourth devices 10 to 40 may be distinguished by grouping, or using predetermined icons or different fonts.

The user interface 130 may also display whether the wireless/optical connection is available or not using contrast. For example, if the wireless/optical connection is not available, the user interface 130 may make dark devices connected in a wireless/optical manner to the display apparatus 100, so as to notify that it is impossible to use wireless/optical connection. Additionally, the user interface 130 may display a window through which the user is able to decide whether or not to turn the wireless/optical module on or off.

Furthermore, the user interface 130 may detect input ports, and may then activate and display only devices connected to the display apparatus 100, so that there activated devices may be distinguished from devices not connected to the display apparatus 100.

The controller 140 controls the power supply of the power supply unit 120 according to which device is selected by the user from the device list displayed on the user interface 130.

For example, if the user selects the first and second devices 10 and 20 for performing wireless/optical communication, the controller 140 may control the power supply unit 120 to supply power to the wireless/optical interface 110.

Alternatively, if the user selects the third and fourth devices 30 and 40 for performing wired communication, the controller 140 may control the power supply unit 120 to cut off power to the wireless/optical interface 110.

In more detail, if the user selects the first device 10 while the third device 30 is operated, the controller 140 may control the power supply unit 120 to supply power to the wireless/optical interface 110. Alternatively, if the user selects the third device 30 while the first device 10 is operated, the controller 140 may control the power supply unit 120 to cut off power to the wireless/optical interface 110.

The controller 140 may transmit the power supply control signal to the first external apparatus 200. More specifically, the controller 140 converts the power supply control signal into a packet and transmits the packet to the first external apparatus 200. The controller 140 may also transmit required control signals such as a power on/off control signal.

The signal processor 160 converts a signal received via the wireless/optical interface 110 or wired interface 150 into a signal of a format capable of being processed by the display unit 170.

The signal processor 160 may comprise various elements required for signal processing of the display apparatus 100, for example a decoder which decodes a composite video broadcast signal (CVBS) or an S-video signal, an ADC which converts a received component signal or PC signal into a digital signal, or a transition minimized differential signaling (TMDS) receiver which divides a digital visual interface (DVI) signal into R, G, B digital signals and HN signal.

Additionally, the signal processor 160 may comprise a scaler which converts the converted signal to match the vertical frequency, resolution, and screen ratio in accordance with the output standard of the display unit 170.

The display unit 170 displays a video signal processed by the signal processor 160 on a screen. The display unit 170 may be implemented as a digital light processing (DLP), a liquid crystal display (LCD), or a plasma display panel (PDP).

In the exemplary embodiment of the present invention, the power supply to the wireless/optical interface 110 and first wireless/optical interface 210 may be controlled according to the type of device selected, as described above. However, according to another exemplary embodiment of the present invention, a menu may be provided through which a user can select whether or not to turn on or off the wireless/optical interface 110 and first wireless/optical interface 210, the wireless/optical interface 110 and first wireless/optical interface 210 may be turned on or off according to user selection, and a list of devices available according to whether the wireless/optical interface 110 and first wireless/optical interface 210 are turned on or off may then be displayed.

For example, if a user desires to select a device connected in a wireless/optical manner to the display apparatus 100, he or she may turn on the wireless/optical interface 110 using the menu provided by a user interface 130. In this situation, the first external apparatus 200 connected to the display apparatus 100 in a wireless/optical manner may also be powered on according to the control of the controller 140.

If the wireless/optical interface 110 is powered on, the user interface 130 may display a list showing only the first and second devices 10 and 20, which are connected in a wireless/optical manner to the display apparatus 100 through the first external apparatus 200.

Alternatively, the user interface 130 may display a list of all devices (namely, the first to fourth devices 10 to 40) connected to the display apparatus 100, but may activate only the first and second devices 10 and 20 for performing wireless/optical communication, so that a user can easily select the first and second devices 10 and 20. Additionally, if the wireless/optical interface 110 is not available, the user may enter the external input mode, and the user interface 130 may display a list showing only the third and fourth devices 30 and 40 for performing wired communication.

Figure 5A:
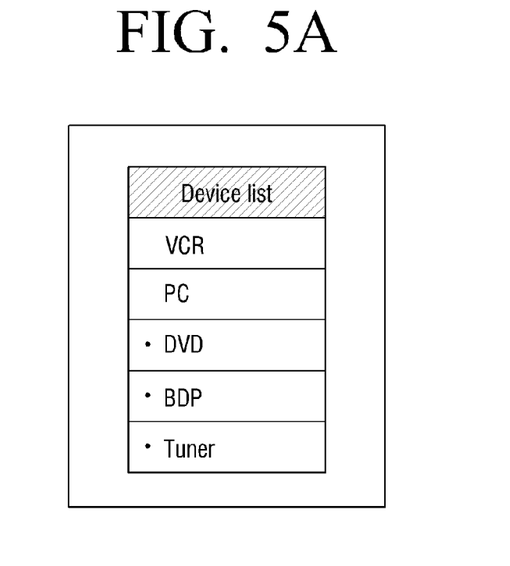
FIGS. 5A and 5B are views explaining a method for displaying a device list according to an exemplary embodiment of the present invention.
Figure 5B:
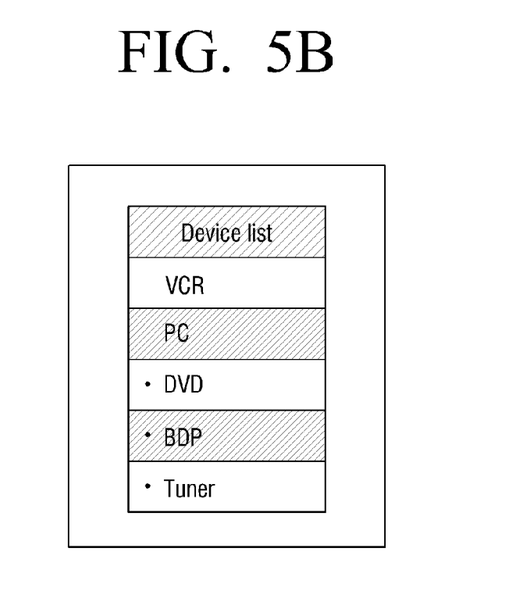

FIGS. 5A and 5B are views explaining a method for displaying a device list according to an exemplary embodiment of the present invention.

As shown in FIG. 5A, if a user selects the external input mode, a device list of all devices capable of being connected to the display apparatus 100 is displayed. In the device list of FIG. 5A, devices marked with '●', namely a DVD, Blu-ray disc player (BDP) and tuner, indicate devices connected to the display apparatus 100 in wireless/optical manner, and thus these devices may be distinguished from other devices, namely a VCR and PC, which are connected to the display apparatus 100 in wired manner.

In a device list shown in FIG. 5B, a VCR, DVD and tuner connected to the display apparatus 100 are activated, and a PC and BDP which are not connected to the display apparatus 100 are inactivated.

Figure 6A:
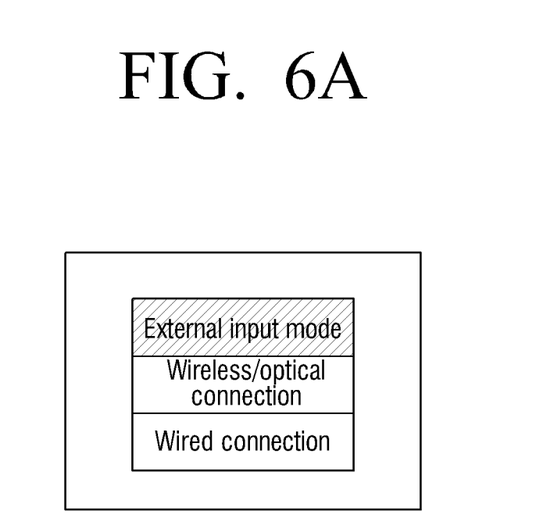
FIGS. 6A and 6B are views explaining a menu display method according to another exemplary embodiment of the present invention.
Figure 6B:
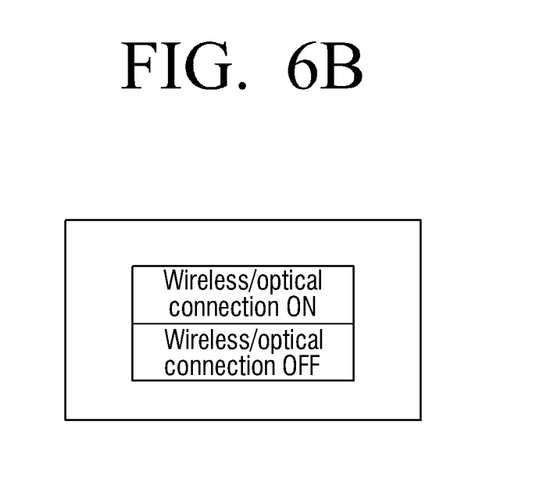

FIGS. 6A and 6B are views explaining a menu display method according to another exemplary embodiment of the present invention.

In FIG. 6A, if a user selects the external input mode, a menu for selecting the connection type may be displayed instead of a list of devices capable of being connected to the display apparatus 100. Accordingly, the user may select either a wireless/optical connection or a wired connection from the displayed menu.

FIG. 6B exemplary illustrates a menu through which a user can select whether or not to turn the wireless/optical module on or off.

Figure 7A:
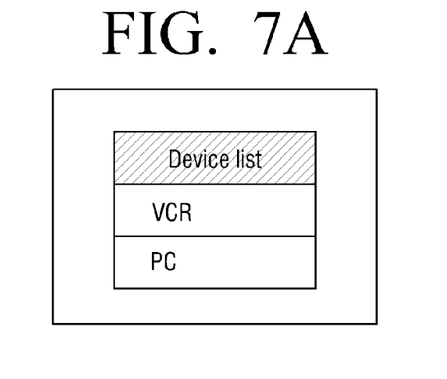
FIGS. 7A to 7C are views explaining a method for displaying a device list according to the connection type selected from a menu of FIG. 6A.
Figure 7B:
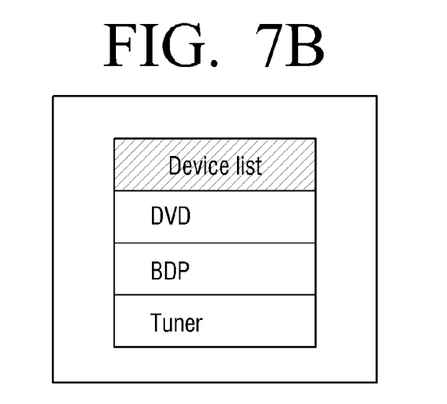
Figure 7C:
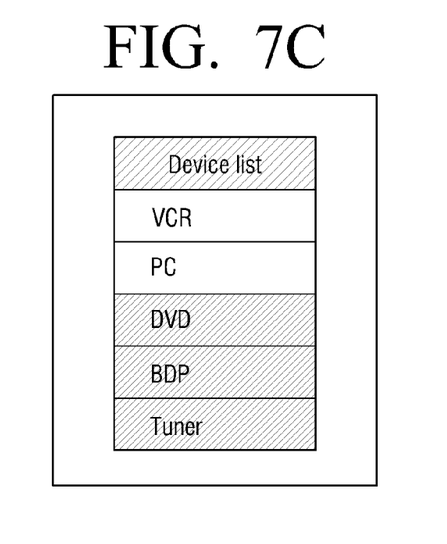

FIGS. 7A to 7C are views explaining a method for displaying a device list according to the connection type selected from the menu of FIG. 6A.

If the user selects the wired connection from the menu of FIG. 6A, a list showing a VCR and PC for wired communication with the display apparatus 100 may be displayed, as shown in FIG. 7A.

Alternatively, if the user selects the wireless/optical connection from the menu of FIG. 6A, a list showing a DVD, BDP and tuner for wireless/optical communication with the display apparatus 100 may be displayed, as shown in FIG. 7B.

As shown in FIG. 7C, a list of all devices connected to the display apparatus 100 may be displayed, even when the user selects the wireless/optical connection from the menu of FIG. 6A. However, in this situation, only the DVD, BDP and tuner may be activated.

Figure 8:
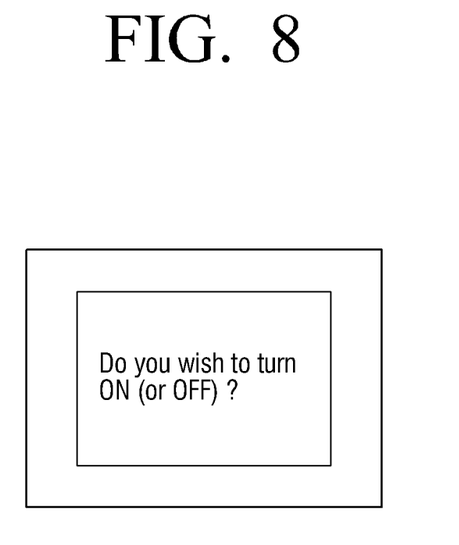
FIG. 8 is a view explaining a method for displaying a confirmation window according to an exemplary embodiment of the present invention.

FIG. 8 is a view explaining a method for displaying a confirmation window according to an exemplary embodiment of the present invention.

The confirmation window of FIG. 8 may be displayed on the screen when there is a change in whether or not power is supplied to the wireless/optical module. For example, if the display apparatus 100 performs wireless/optical communication with devices for wireless/optical communication, and then performs wired communication with devices for wired communication; or if the display apparatus 100 is powered on after being powered off and a user enters the external input mode and selects one from among devices for wireless/optical communication, the confirmation window may be displayed as shown in FIG. 8. Accordingly, the confirmation window may be displayed in the form of a pop-up window, in order to notify the user of a change in whether or not power is supplied to the wireless/optical module.

Figure 9:
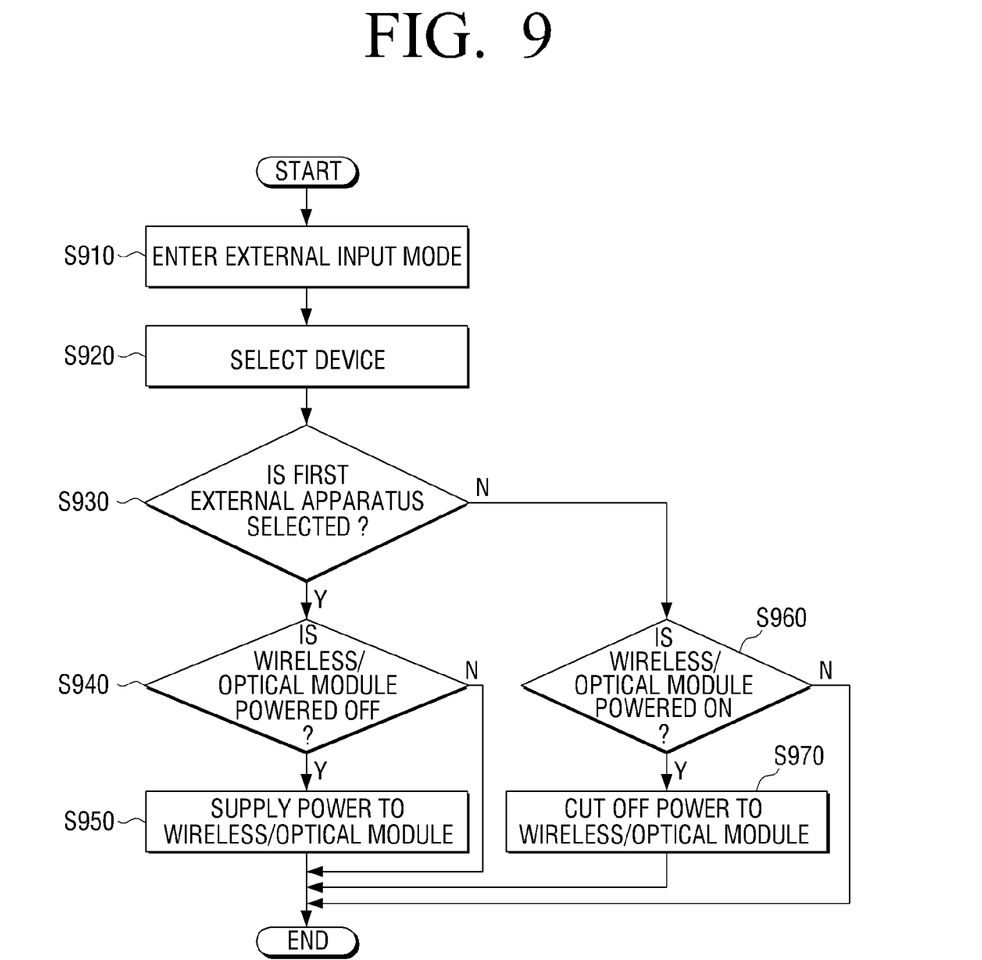
FIG. 9 is a flowchart explaining a method for controlling a display apparatus according to an exemplary embodiment of the present invention.

FIG. 9 is a flowchart explaining a method for controlling a display apparatus according to an exemplary embodiment of the present invention.

If a user enters the external input mode (S910), a device list showing devices connected to a display apparatus is displayed on a screen. Here, these devices may be a DVD player, a VCR or a blue ray player which transmit input signals to the display apparatus.

If the user selects one device from the device list (S920), whether a first external apparatus is selected is determined (S930). In this situation, the first external apparatus is able to perform wireless/optical communication with the display apparatus using a wireless/optical module, and the devices shown in the device list may be connected to the display apparatus directly or using a relay device such as an STB. Additionally, the wireless/optical module refers to an interface, which supports wireless/optical communication between the display apparatus and the first external apparatus.

If it is determined that the first external apparatus is selected (S930:Y), whether the wireless/optical module is powered off is determined (S940). For example, if a device for performing wired communication is currently operated, or if the display apparatus is in power off mode, the wireless/optical module is also in power off mode.

If it is determined that the wireless/optical module is powered off (S940:Y), the display apparatus supplies power to the wireless/optical module and performs wireless/optical communication (S950). Alternatively, if it is determined that the wireless/optical module is powered on (S940:N), for example if a device for performing wireless/optical communication is currently operated, the display apparatus continues to supply power to the wireless/optical module.

If it is determined that the first external apparatus is not selected (S930:N), whether the wireless/optical module is powered on is determined (S960).

If it is determined that the wireless/optical module is powered on (S960:Y), for example if a device for performing wireless/optical communication is currently operated, the display apparatus cuts off power to the wireless/optical module (S970). Alternatively, if it is determined that the wireless/optical module is powered off (S960:N), the power off mode of the wireless/optical module is maintained. Accordingly, it is possible to prevent power consumption.

According to another exemplary embodiment of the present invention, after a user turns a wireless/optical module on or off before selecting a device from a device list, a list of devices available according to whether the wireless/optical module is turned on or off may then be displayed, of which detailed description has been given above, so no further description is required.

Therefore, it is possible to control whether or not to supply power to the wireless/optical module which supports wireless/optical communication, and thus to prevent power consumption.

While the display apparatus performs wireless/optical communication with a single device in the exemplary embodiment of the present invention, the present invention is also applicable to a situation in which the display apparatus performs wireless/optical communication with two or more devices.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
   a wireless and optical interface including a wireless and optical receiver configured to perform wireless and optical communication with an external device;
   a power supply unit having a power output port connected to the wireless and optical interface;
   a wired interface including a wired receiver through which the display apparatus is configured to perform wired communication with a second external device via a wired connection;
   a display including a user input unit; and
   a controller connected to and configured to receive signals from the wireless and optical receiver, connected to and configured to receive signals from the wired receiver, connected to the display, and connected to the power supply unit,
   wherein the controller is configured to send signals to the display to cause it to display a user interface on which the external device and the second external device are listed, and prompting a user to select one of the external device and the second external device;
   wherein the controller is configured to receive a signal from the display indicative of a selection made through the user input unit; and
   wherein the controller is configured to send control signals to the power supply unit to cause the power supply unit to turn on power to the wireless and optical interface when the external device is selected, and to turn off power to the wireless and optical interface when the second external device is selected.

2. The display apparatus as claimed in claim 1, wherein the selected external device is a source device which provides a source input.

3. The display apparatus as claimed in claim 1, wherein the user interface further displays a list containing a third external device connected to the external device which performs the wireless and optical communication with the display apparatus.

4. The display apparatus as claimed in claim 1, wherein the controller controls the user interface to display a confirmation window, if there is a change in whether the power supply unit supplies the power supply to the wireless and optical interface.

5. The display apparatus as claimed in claim 1, wherein the controller transmits a control signal to the selected external device to control power on/off state of the selected external device.

6. A method comprising:
   transmitting wireless and optical signals from an external device;
   transmitting signals via a wire line from a second external device;
   receiving the wireless and optical signals at a wireless and optical interface of a display apparatus and producing corresponding first electrical signals;
   receiving the wire line signals at a wired interface of the display apparatus and producing corresponding second electrical signals;
   receiving the first and second signals at a controller in the display apparatus;
   sending control signals from the controller to a display in the display apparatus to cause a user interface to be displayed, wherein the user interface displays a list including the external device and the second external device, and the user interface prompts a user to select one of the external device and the second external device;
   receiving from a user input unit a selection of one of the external device and second external device;
   sending a signal indicative of the selection from the display to the controller;
   sending a control signal from the controller to a power supply unit in response to the signal indicative of the selection, wherein the control signal to the power supply unit causes the power supply unit to turn on power to the wireless and optical interface when the external device is selected, and to turn off power to the wireless and optical interface when the second external device is selected.

7. The method as claimed in claim 6, wherein the selected external device is a source device which provides a source input.

8. The method as claimed in claim 6, wherein the list on the user interface further includes an external device connected to the external device which performs the wireless and optical communication with the display apparatus.

9. The method as claimed in claim 6, further comprising:
   displaying a confirmation window, if there is a change in whether the power supply is supplied to the wireless and optical module.

10. The method as claimed in claim 6, further comprising: transmitting a control signal to the selected external device to control power on/off state of the selected external device.

11. The display apparatus according to claim 1, wherein a video signal is received through the wireless connection and an audio signal is received through an optical connection.

* * * * *